United States Patent
Bennie et al.

(10) Patent No.: US 9,481,295 B2
(45) Date of Patent: Nov. 1, 2016

(54) EMERGENCY VEHICLE MANEUVER COMMUNICATIONS

(71) Applicant: Ford Global Technologies, LLC, Dearborn, MI (US)

(72) Inventors: Brian Bennie, Sterling Heights, MI (US); Brad Alan Ignaczak, Canton, MI (US); Randy Michael Freiburger, Novi, MI (US); Thomas Lee Miller, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/611,883

(22) Filed: Feb. 2, 2015

(65) Prior Publication Data

US 2015/0266411 A1    Sep. 24, 2015

Related U.S. Application Data

(60) Provisional application No. 61/969,126, filed on Mar. 22, 2014, provisional application No. 61/969,122, filed on Mar. 22, 2014, provisional application No. 61/969,123, filed on Mar. 22, 2014, provisional application No. 61/969,124, filed on Mar. 22, 2014.

(51) Int. Cl.
*B60Q 1/26* (2006.01)
*B60Q 1/44* (2006.01)
(Continued)

(52) U.S. Cl.
CPC ............. *B60Q 1/2611* (2013.01); *B60Q 1/38* (2013.01); *B60Q 1/44* (2013.01); *B60Q 1/50* (2013.01); *B60W 10/06* (2013.01); *B60W 10/10* (2013.01); *B60W 10/18* (2013.01); *B60W 10/20* (2013.01); *G01S 13/931* (2013.01); *G01S 15/66* (2013.01);
(Continued)

(58) Field of Classification Search
CPC ......... B60Q 1/2611; B60Q 1/44; B60Q 1/38
USPC ...................................................... 701/36
See application file for complete search history.

(56) References Cited

U.S. PATENT DOCUMENTS

| 6,121,896 A | 9/2000 | Rahman |
| 6,679,702 B1 * | 1/2004 | Rau ............. G09B 9/02 340/435 |

(Continued)

FOREIGN PATENT DOCUMENTS

| DE | 102006019495 A1 | 10/2007 |
| DE | 102006036458 A1 | 2/2008 |

(Continued)

OTHER PUBLICATIONS

Great Britain Search Report dated Sep. 11, 2015 (4 pages).

(Continued)

*Primary Examiner* — Mussa A Shaawat
*Assistant Examiner* — Yazan Soofi
(74) *Attorney, Agent, or Firm* — Frank MacKenzie; Bejin Bieneman PLC (57) ABSTRACT

Improved vehicle emergency lighting control may be implemented in a vehicle computer. Data may be collected related to a pursuit of a second vehicle. The collected data can be used to determine at least one of an action of the first vehicle and an action of the second vehicle. An emergency light in the first vehicle can be controlled based on the at least one determined action.

20 Claims, 5 Drawing Sheets

(51) Int. Cl.
   *B60Q 1/38* (2006.01)
   *B60W 10/06* (2006.01)
   *B60W 10/10* (2012.01)
   *B60W 10/18* (2012.01)
   *B60W 10/20* (2006.01)
   *G01S 15/66* (2006.01)
   *G01S 17/66* (2006.01)
   *G07C 5/00* (2006.01)
   *G08G 1/16* (2006.01)
   *G01S 13/93* (2006.01)
   *B60Q 1/50* (2006.01)
   *G01S 13/72* (2006.01)
   *G07C 5/08* (2006.01)

(52) U.S. Cl.
   CPC ............... *G01S 17/66* (2013.01); *G07C 5/008* (2013.01); *G08G 1/166* (2013.01); *B60W 2710/06* (2013.01); *B60W 2710/10* (2013.01); *B60W 2710/18* (2013.01); *B60W 2710/20* (2013.01); *B60W 2750/40* (2013.01); *G01S 13/72* (2013.01); *G01S 2013/9364* (2013.01); *G01S 2013/9367* (2013.01); *G07C 5/085* (2013.01)

(56) References Cited

U.S. PATENT DOCUMENTS

| | | |
|---|---|---|
| 7,884,705 B2 | 2/2011 | Nishimura et al. |
| 8,295,547 B1 | 10/2012 | Cangiani |
| 9,079,571 B2 * | 7/2015 | Trost .................. B60T 7/22 |
| 2007/0222639 A1 | 9/2007 | Giles et al. |
| 2008/0122652 A1 * | 5/2008 | Tengler ............... B60Q 1/44 340/902 |
| 2009/0157286 A1 | 6/2009 | Saito et al. |
| 2009/0212935 A1 * | 8/2009 | Luo ................... B60Q 1/444 340/467 |
| 2010/0007523 A1 | 1/2010 | Hatav |
| 2011/0190972 A1 | 8/2011 | Timmons et al. |
| 2011/0313665 A1 | 12/2011 | Lueke et al. |
| 2013/0085636 A1 | 4/2013 | You et al. |
| 2013/0173114 A1 | 7/2013 | Pillai |
| 2013/0311035 A1 | 11/2013 | Czyz et al. |
| 2015/0065060 A1 * | 3/2015 | Stahlin ............ B60Q 1/0017 455/73 |
| 2015/0086175 A1 | 3/2015 | Lorenzetti |
| 2015/0151753 A1 * | 6/2015 | Clarke ............... B60W 30/00 701/25 |

FOREIGN PATENT DOCUMENTS

| | | |
|---|---|---|
| FR | 2871915 A1 | 12/2005 |
| JP | 2013095404 A | 9/2007 |

OTHER PUBLICATIONS

Non-Final Office Action dated Oct. 5, 2015; U.S. Appl. No. 14/611,901; 17 pages.

Non-Final Office Action dated Dec. 24, 2015 in copending U.S. Appl. No. 14/611,848; 22 pages.

* cited by examiner

EMERGENCY VEHICLE MANEUVER COMMUNICATIONS

RELATED APPLICATIONS

This application claims priority to Provisional Application Ser. No. 61/969,126 filed Mar. 22, 2014 entitled "Emergency Vehicle Maneuver Notification"; Provisional Application Ser. No. 61/969,122 filed Mar. 22, 2014 entitled "Tracking a Suspect From a Vehicle"; Provisional Application Ser. No. 61/969,123 filed Mar. 22, 2014 entitled "Approach Warning for a Police Vehicle"; and Provisional Application Ser. No. 61/969,124 filed Mar. 22, 2014 entitled "Approach Warning for a Police Vehicle", each of which provisional applications are hereby incorporated herein by reference in their respective entireties.

BACKGROUND

In events such as police pursuit and emergency response situations when emergency lighting is activated in an emergency vehicle such as a police car, ambulance, fire truck, etc., roof and rear window mounted light-bars or the like project emergency vehicle lighting directed rearward. Where multiple emergency vehicles are travelling, e g., one behind the other, in an emergency situation, drivers of following vehicles supporting the pursuit or emergency response often experience bright lighting from a lead vehicle and/or other vehicles in front of the following vehicle, such bright lighting generally being experienced at a time when aggressive and/or difficult driving maneuvers are required. The effect of bright flashing lights in a lead vehicle or vehicles can cause a delay and or failure in driving response(s) of a driver exposed to such lighting.

DETAILED DESCRIPTION

System Overview

Figure 1:
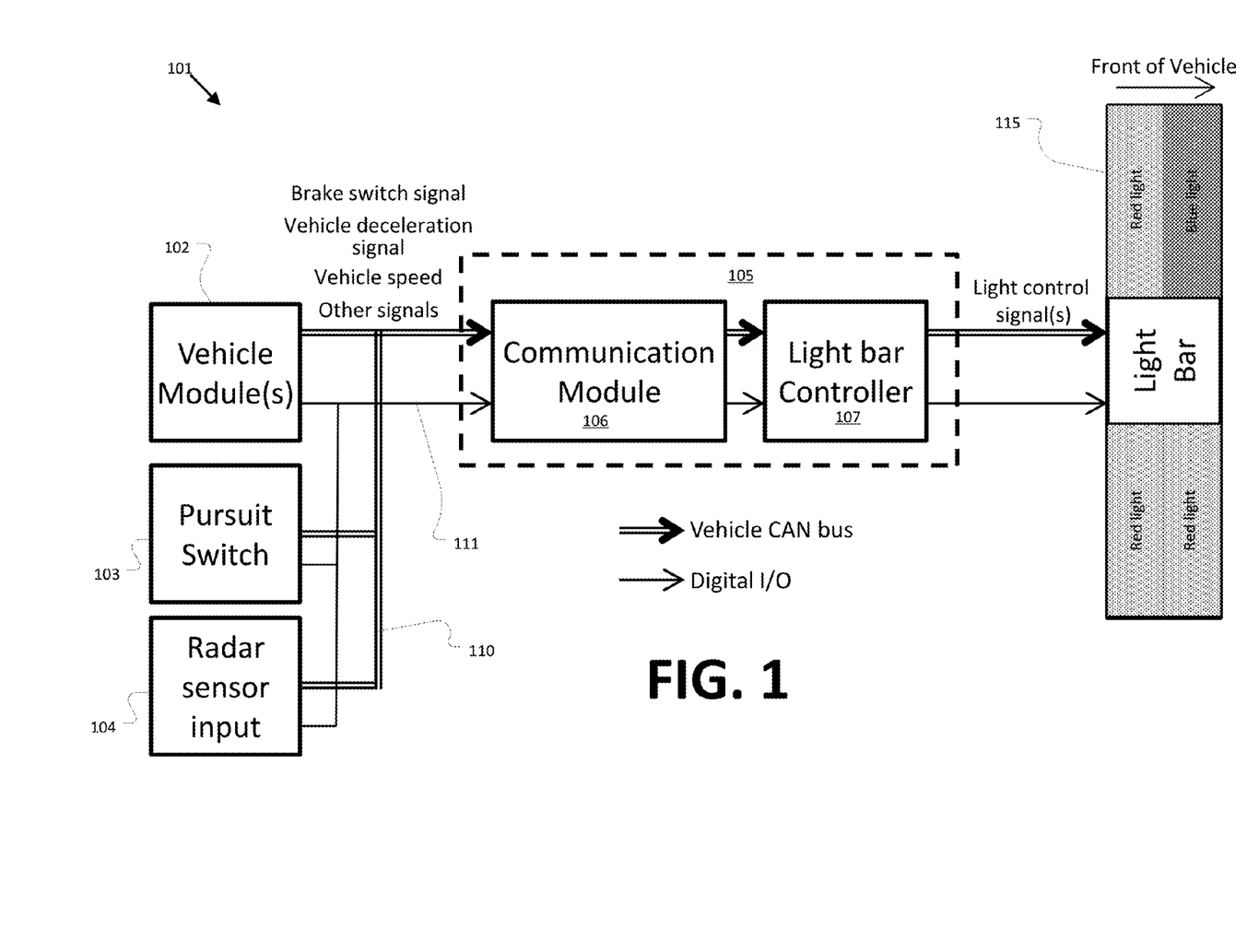
FIG. 1 is a block diagram of an exemplary vehicle equipped suspect tracking.
Figure 2:
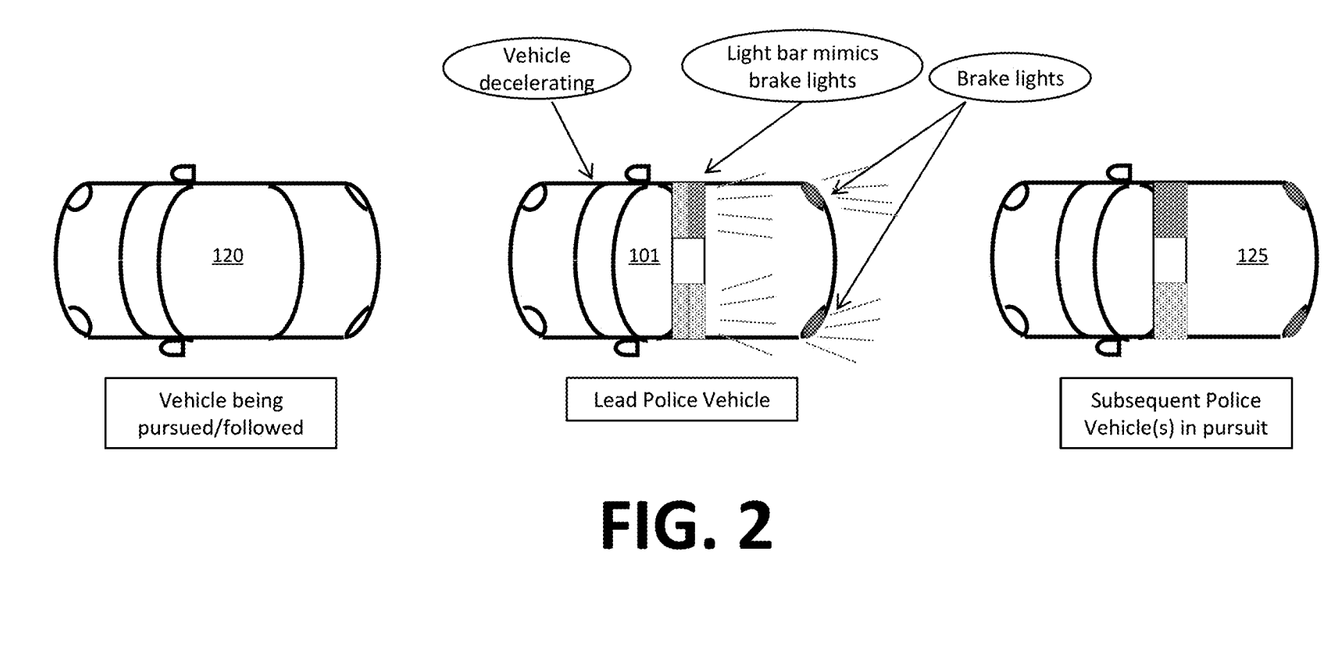
FIG. 2 is a block diagram of an example of a first emergency vehicle, followed by a second emergency vehicle, in pursuit of a suspect vehicle.

FIG. 2 is a block diagram of a first emergency vehicle 101, followed by a second emergency vehicle 125, in pursuit of a suspect vehicle 120. As described herein, and with reference now to FIG. 1, the first, lead, emergency vehicle 101 includes an emergency lighting controller 105 configured to control emergency lights 115 in the vehicle 101, e.g., to command specific light and/or sound patterns and/or low frequency sounds providing an indication to one or more following vehicles 125 of behavior of a lead vehicle 101 in responding to a pursuit, of a response to a call for support and/or any other need for aggressive driving maneuvers to other nearby vehicles. For example, a pursuit switch 103 in the vehicle 101 may be activated, whereupon lighting 115 directed to the rear of the lead vehicle 101 may be reduced and/or a pattern of flashing controlled so as to reduce interference with reactions of following drivers and/or to better signal actions of the lead vehicle 101 to following drivers of vehicles 125. In general, disclosed herein are systems and methods for integrating law enforcement/emergency vehicle equipment such as the emergency lighting controller 105 and a pursuit switch 103 with standard vehicle elements such as modules 102 and the radar sensor input 104.

As illustrated in FIG. 1, a vehicle 101 CAN (controller area network) bus 110 or the like, and/or discrete, i.e., digital, data communications 111 provide information to an emergency lighting controller 105 that may include a communication module 106 and a light bar controller 107. Modules that may provide data to the CAN bus 110 and/or via digital communications 111 include a pursuit switch 103, a radar sensor input 104, and/or other vehicle 101 modules 102. Vehicle 101 sensor 104 output, CAN bus 110 messages, and/or any vehicle outputs 111 indicating status of items such as, but not limited to, vehicle 101 speed, brake status, steering angle, etc., will be used directly by the emergency lighting controller 105 and/or through a "gateway" type interface provided by the communication module 106 between the vehicle 101 systems and the controller 105, including the light bar controller 107. Accordingly, vehicle 101 equipment such as the light bar 115 may be controlled based upon operating conditions defined by vehicle 101 CAN bus 110 communications and/or digital messages 111, thereby to improve notification to nearby vehicles 125 of impending or occurring emergency vehicle maneuvers.

In general, the emergency lighting controller 105 may temporarily disable and/or alter emergency flashing lights, or patterns of the same, in selected directions, and may provide notification, e.g., to following vehicle(s), of certain maneuvers intended and/or taken by a leading vehicle 101 during aggressive driving conditions, e.g., during a pursuit. Further, the lighting controller 105 may provide additional indication(s) of vehicle 101 driving maneuvers during non-aggressive driving conditions such as, but not limited to, using a rear portion of the emergency lighting 115 on rear facing light(s) to duplicate and/or be redundant of the function of vehicle 101 brake lights, and/or using the "traffic advisor" or similar type function that could duplicate and/or be redundant of the function of vehicle 101 turn indicators. As seen in the Figures, the lights 115 can be illuminated according to one or more colors to provide warning and/or messages to a vehicle 101 surroundings.

In addition, vehicle 101 radar system(s) 104 could sense a direction and/or change thereof of the vehicle 120 being pursued and could provide a message/signal to the emergency lighting controller 105 to temporarily disable the rear facing flashing emergency lighting 115 of the vehicle 101, and/or initiate a light pattern indicating direction of the turn for subsequent vehicles 125 in the pursuit. After the turn maneuver, this turn indication feature could be disabled and original emergency lighting flash patterns could resume. As mentioned above, audible and/or low frequency indications of lead vehicle 101 behavior could also be provided.

As stated above, a vehicle 101 includes an emergency lighting controller 105, e.g., that might be included in or communicatively coupled to a computing device in the vehicle 101. The vehicle 101 is generally a land-based vehicle having three or more wheels, e.g., a passenger car, light truck, heavy duty truck such as a fire truck, etc. A computer such as may include the lighting controller 105 generally includes a processor and a memory, the memory including one or more forms of computer-readable media, and storing instructions executable by the processor for performing various operations, including as disclosed herein. Further, such computer may include and/or be communicatively coupled to more than one computing device, e.g., controllers or the like included in the vehicle 101 for monitoring and/or controlling various vehicle components, e.g., an engine control unit, transmission control unit, etc. The computer 105 is generally configured for communications on a controller area network (CAN) bus 110 or the like. The computer 105 may also have a connection to an onboard diagnostics connector (OBD-II), and or other digital communications mechanisms 111.

Via the CAN bus 110, OBD-II, and/or other wired or wireless mechanisms, the computer 105 may transmit messages, e.g., by controlling a color, flash pattern, etc., of one or more lights in the emergency lights 115, to various devices in a vehicle and/or receive messages from the various devices, e.g., controllers, actuators, sensors, etc., including, without limitation, modules 102, the pursuit switch 103, and/or radar sensor input 104. Alternatively or additionally, in cases where a computer actually comprises multiple devices, including the emergency lighting controller 105, the CAN bus or the like may be used for communications between such devices. In addition, a vehicle computer may be configured for communicating with other devices via various wired and/or wireless networking technologies, e.g., cellular, Bluetooth, a universal serial bus (USB), wired and/or wireless packet networks, etc.

FIG. 2 illustrates an example in which a message on the vehicle 101 CAN bus 110 or signal 111 indicating vehicle braking is applied, and/or applied at a predetermined specific brake pressure level, could be read by the gateway communications module 106 and provided to the vehicle 101 light bar controller 107 and/or or read directly by the controller 107 to command the rear facing light(s) in the light bar 115 to duplicate the function of the vehicle 101 brake lights, e.g., at an output/power level equal to emergency response or reduced power/brightness level. Audible and/or low frequency indications can also be provided, as stated above.

Figure 3:
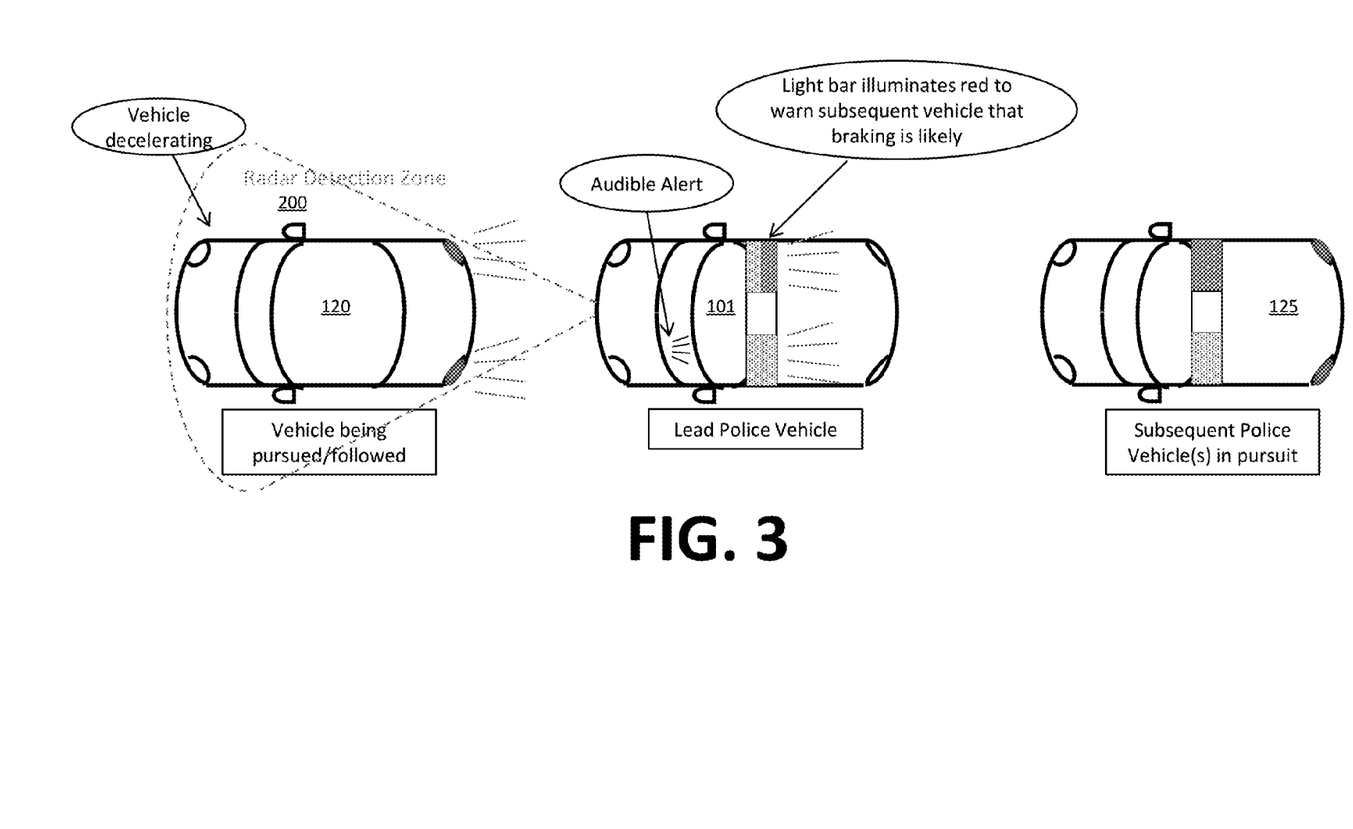
FIG. 3 is another block diagram of an example of a first emergency vehicle, followed by a second emergency vehicle, in pursuit of a suspect vehicle.

With reference to FIG. 3, a front facing radar 104 or other mechanism, e.g., a front facing camera or lidar sensor, may be used to detect a deceleration of a vehicle 120 being pursued, e.g., the vehicle 101 may detect a deceleration rate equal to or greater than a predetermined threshold of the vehicle 120 being pursued, and may provide a signal 111 or CAN bus 110 message read by the gateway/interface module 106 and made available to the light-bar controller 107 and/or read directly by the light-bar controller 107, which may then command rear facing lights of the light-bar 115, rear window mounted lighting, or any other rear-facing emergency lights, e.g., with respect to a light pattern and/or brightness and/or other output that provides an indication of vehicle 101 braking in addition to vehicle 101 brake lights to improve an ability of pursuing/following drivers of vehicles 125 to respond to maneuvers of the vehicle 101, e.g., during aggressive driving maneuvers. A light pattern could be displayed without the lead vehicle 101 brakes being applied. Audible and/or low frequency indications can also be included, as stated above.

Figure 4:
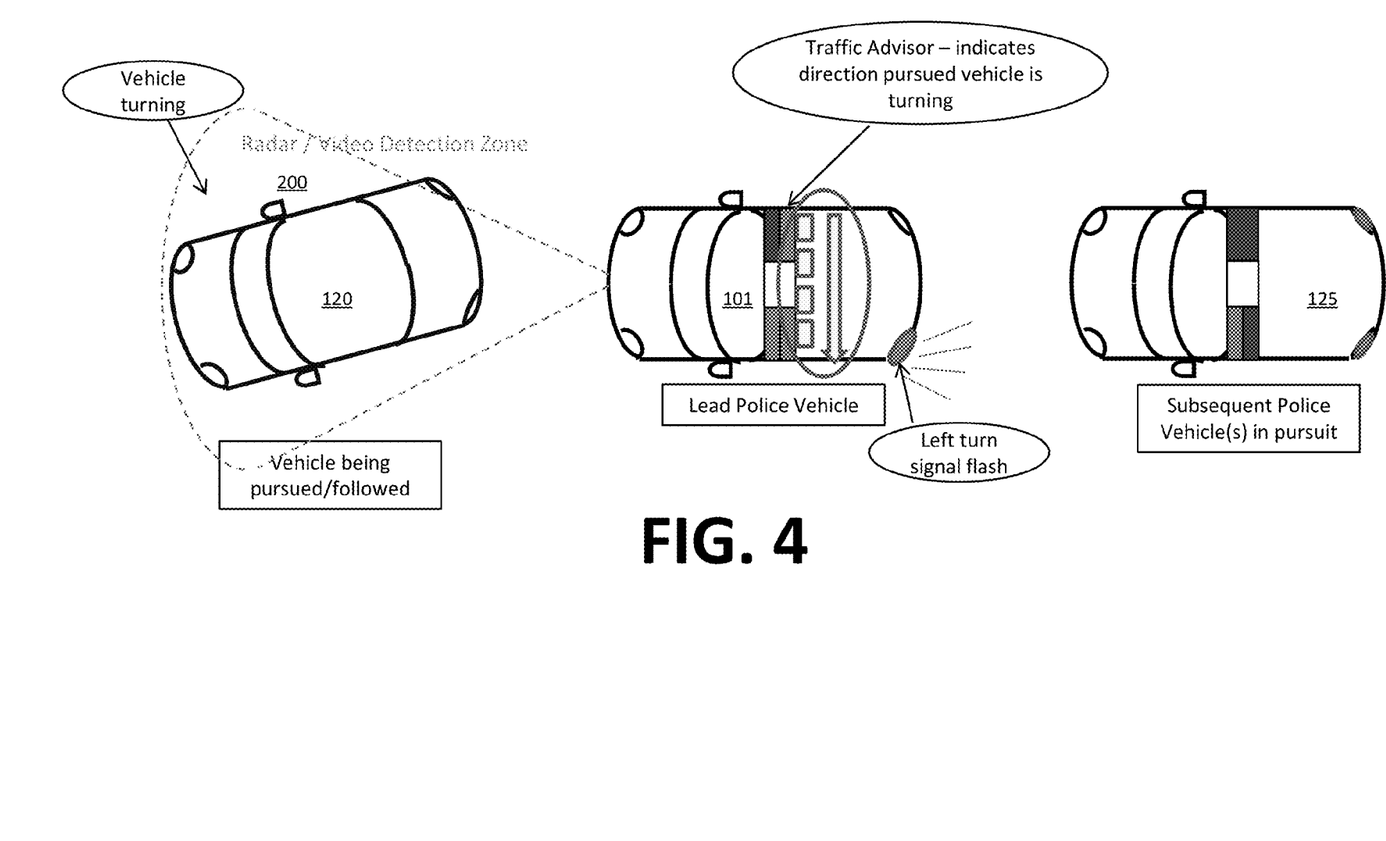
FIG. 4 is yet another block diagram of an example of a first emergency vehicle, followed by a second emergency vehicle, in pursuit of a suspect vehicle.

With reference to FIG. 4, a front facing radar 104 or other mechanism, e.g., a front facing camera or lidar sensor that may be included in modules 102 may be used to detect a lateral movement of a vehicle 120 being pursued, e.g., may detect a direction of a turn (left or right) of a vehicle 120 in front and accordingly the emergency lighting controller 105 may command the rear facing lights of the light-bar 115, rear window mounted lighting, and/or "traffic advisor" type of bar, to illuminate a flash pattern indicating the direction of the turn to following vehicles to improve an ability of following vehicles 125 to respond, e.g., during aggressive driving maneuvers.

Modules 102 in a vehicle 101 may receive data from a variety of devices, e.g., sensors such as one or more ultrasonic sensors, cameras, lidar sensors, radar sensors, infrared sensors, etc. Further, the foregoing examples are not intended to be limiting; other data could also be provided to a vehicle computer, including the emergency lighting controller 105 and/or other vehicle 101 controllers, from modules 102 such as steering, brake, transmission, engine, etc., controllers, e.g., to provide data via the CAN bus 110 relating to vehicle 101 speed, acceleration, etc. Further, sensors or the like, global positioning system (GPS) equipment, etc., could be included in a vehicle 101 and configured to provide data directly to vehicle 101 computing devices, e.g., via a wired or wireless connection.

Vehicle 101 computing devices include a memory that generally stores data collected as described above. Such data may include a variety of data collected in a vehicle 101. Examples may include measurements relating to a position, velocity, and size (e.g., length, width, height, radar cross section) of target(s) such as a vehicle 125 in or near a detection zone 200. Data 115 may additionally include data calculated therefrom in a computer such as the controller 105 and/or other vehicle 101 computer.

The vehicle 101 generally includes a human machine interface. In general, the HMI is equipped to accept inputs for, and/or provide outputs from, one or more vehicle 101 computers, e.g., the controller 105. For example, the vehicle 101 may include one or more of a display configured to provide a graphical user interface (GUI) or the like, an interactive voice response (IVR) system, one or more audio output devices, etc.

Figure 5:
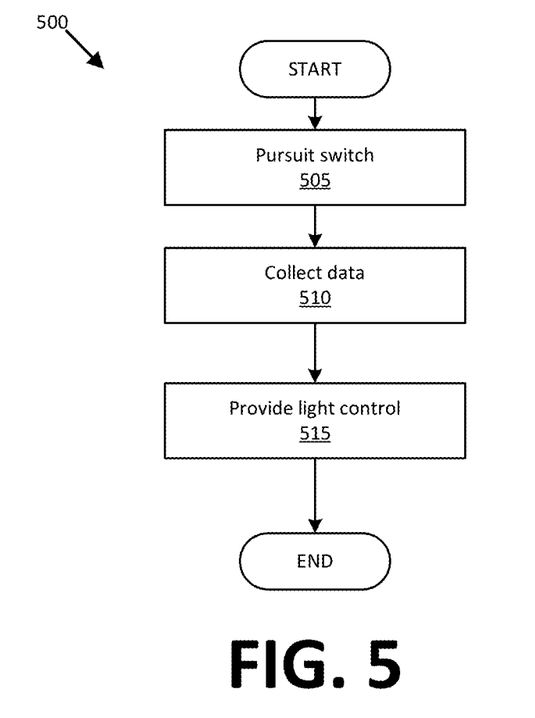
FIG. 5 is a diagram of an exemplary process for emergency vehicle lighting control.

FIG. 5 is a diagram of an exemplary process 500 for emergency vehicle 101 lighting control. The process 500 begins in a block 505, in which a pursuit switch 103 in a vehicle 101 is selected. As noted above, selection of the pursuit switch 103 may indicate that the vehicle 101 is in pursuit of a vehicle 120. Generally, selection of the pursuit switch 103 initiates operations of the emergency lighting controller 105 such as described above. Further, additional input may be required to initiate such operations of the emergency lighting controller 105, e.g., input from a vehicle 101 driver or occupant that following emergency vehicles 125 are present, detection of following emergency vehicles 105 via vehicle-two-vehicle communications, sensor data as described above, or some other mechanism.

Next, in a block 510, the controller 105 collects data concerning vehicle 101 and/or vehicle 120 operations, e.g., as described above, a vehicle 120 could be detected accelerating, decelerating, turning, etc., as could a vehicle 101.

Next, in a block 515, the emergency lighting controller 105 provides control of vehicle 101 lights, e.g., in a light-bar 115, rear window lights, and/or other lights provided for emergency operation, based on data collected as described above with respect to the block 510. Further, audible output may be additionally or alternatively provided as described above.

The process 500 ends following the block 515, e.g., based on input received via the switch 103 or some other mechanism, when a vehicle 101 is stopped or powered off, etc.

CONCLUSION

In addition or as an alternative to exemplary operations described above, Appendix A attached hereto may further describe such operations and/or relevant subject matter.

The term "police" as used herein may refer to various public and/or private law enforcement and/or security operations, in addition to referring to a formal police department.

Computing devices such as those discussed herein, e.g., the controller 105, generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system for improved vehicle emergency lighting control, comprising a computer deployable in a first vehicle, the computer comprising a processor and a memory, wherein the computer is programmed to:
    collect data related to a pursuit of a second vehicle;
    use the collected data to identify a turn of at least one of the first vehicle and the second vehicle; and
    control an emergency light in the first vehicle based on the at least one determined turn.

2. The system of claim 1, wherein the collected data includes at least one of a position, speed, acceleration, deceleration, and turning of the first vehicle.

3. The system of claim 1, wherein the collected data includes at least one of a position, speed, acceleration, deceleration, and turning of the second vehicle.

4. The system of claim 1, wherein the collected data includes at least one of ultrasonic, image, radar, lidar, global positioning system (GPS), and infrared data.

5. The system of claim 1, wherein the collected data includes data from at least one of a steering controller, a brake controller, an engine controller, and a transmission controller.

6. The system of claim 1, wherein the emergency light in the first vehicle faces a rear portion of the first vehicle.

7. The system of claim 1, wherein the computer is further programmed to detect activation of a pursuit switch before executing the control of the emergency light in the first vehicle based on the at least one determined action.

8. The system of claim 1, wherein the control of the emergency light in the first vehicle is provided according to a communication sent via a controller area network (CAN) bus in the first vehicle.

9. The system of claim 1, wherein the control of the emergency light in the first vehicle is provided according to a communication sent via a discrete communication.

10. The system of claim 1, wherein the computer is further programmed to provide an audible indication of the determined action.

11. A method for improved vehicle emergency lighting control, comprising, in a computer in a first vehicle:
    collecting data related to a pursuit of a second vehicle;
    using the collected data to identify a turn of at least one of the first vehicle and the second vehicle; and
    controlling an emergency light in the first vehicle based on the at least one determined action.

12. The method of claim 11, wherein the collected data includes at least one of a position, speed, acceleration, deceleration, and turning of the first vehicle.

13. The method of claim 11, wherein the collected data includes at least one of a position, speed, acceleration, deceleration, and turning of the second vehicle.

14. The method of claim 11, wherein the collected data includes at least one of ultrasonic, image, radar, lidar, global positioning system (GPS), and infrared data.

15. The method of claim 11, wherein the collected data includes data from at least one of a steering controller, a brake controller, an engine controller, and a transmission controller.

16. The method of claim 11, wherein the emergency light in the first vehicle faces a rear portion of the first vehicle.

17. The method of claim 11, further comprising detecting activation of a pursuit switch before executing the control of the emergency light in the first vehicle based on the at least one determined action.

18. The method of claim 11, wherein the control of the emergency light in the first vehicle is provided according to a communication sent via a controller area network (CAN) bus in the first vehicle.

19. The method of claim 11, wherein the control of the emergency light in the first vehicle is provided according to a communication sent via a discrete communication.

20. The method of claim 11, further comprising providing an audible indication of the determined action.

\* \* \* \* \*